United States Patent [19]

McCarthy

[11] 3,992,735
[45] Nov. 23, 1976

[54] FLOTATION RING FOR DREDGE PIPE LINES

[76] Inventor: Edward P. McCarthy, 360 SW. 18th Terrace, Miami, Fla. 33129

[22] Filed: Sept. 11, 1975

[21] Appl. No.: 612,361

Related U.S. Application Data

[63] Continuation-in-part of Ser. No. 519,811, Nov. 1, 1974, abandoned.

[52] U.S. Cl. .................................. 9/8 R; 9/340; 9/345
[51] Int. Cl.² ........................................ B63B 21/52
[58] Field of Search ............. 9/8 R, 11 A, 337, 340, 9/345; 37/72

[56] References Cited
UNITED STATES PATENTS

| 1,069,691 | 8/1913 | Hansen | 9/337 |
|---|---|---|---|
| 1,875,630 | 9/1932 | Marengo | 9/340 X |
| 3,121,240 | 2/1964 | MacKenzie | 9/345 X |
| 3,155,992 | 11/1964 | Sheumake et al. | 9/11 A |
| 3,332,093 | 7/1967 | Skinner et al. | 9/8 R |
| 3,489,182 | 1/1970 | Cameron | 9/8 R |
| 3,742,538 | 7/1973 | Smith | 9/340 |

*Primary Examiner*—Trygve M. Blix
*Assistant Examiner*—Gregory W. O'Connor
*Attorney, Agent, or Firm*—Ernest H. Schmidt

[57] ABSTRACT

A hollow, flexible, two-sided, substantially C-shaped open ring which, when deflated, can readily be distorted for easy application in surrounding relation with respect to a length of dredge pipe, including strap means for temporarily securing the ring in place, and which when subsequently inflated, assumes a substantially circular cross-sectional shape and constricts radially to securely embrace the peripheral wall of the pipe for use in the flotation thereof.

5 Claims, 5 Drawing Figures

FLOTATION RING FOR DREDGE PIPE LINES

This is a continuation-in-part of my patent application Ser. No. 519,811, filed Nov. 1, 1974, now abandoned, titled Flotation Ring for Dredge Pipe Lines.

In dredging operations wherein sand, rock and the like materials are removed from a seabed for displacement to another location such as upon the shore, for example, it is common practice to pump the dredged materials through steel dredge pipe lines which in many instances extend for thousands of feet. Where such dredging operations are carried out in protected areas such as harbors and the like, the dredge piping, ordinarily of steel in diameters of 12 to 30 inches, is kept afloat by a series of flotation rings or steel pontoons closely spaced along the length of the piping. Flotation rings heretofore utilized were of solid construction, usually of a core of polyurathane foam encased in a protective plastic shell. These flotation rings were supplied as a pair of semi-circular segmental portions fitted together around the pipe and secured in place by a surrounding steel band. Such flotation rings are deficient in various respects, principally in that they become readily damaged with hard usage and in that their assembly to the dredge pipe, because of the banding, requires the work of two men.

The principal object of this invention is to provide a novel and improved flotation ring that can readily be installed by a single operator, and which will be practically indestructible under normal operating conditions so as to be re-usable indefinitely.

Another object of the invention is to provide a flotation ring of the character described which, after installation, forms a substantially complete circle of annular cross-sectional shape about the dredge pipe, so as to offer substantially uniform buoyancy at any position thereabout to permit the pipe line to slowly rotate about its longitudinal axis automatically as lowermost interior wall portions of the pipe line are worn away during the pumping therethrough of abrasive materials, thereby achieving substantially uniform wearing away of the inner wall of the pipe line for maximizing its useful life.

Another object of the invention is to provide a flotation ring of the character described which will be collapsible to facilitate storage and transportation when not in use.

A more particular object of the invention is to provide flotation ring comprising a pair of C-shaped front and back sidewall portions of a tough, flexible water tight material secured to one another about their mating peripheral edges by a doubled-over length of reinforcing material sandwiched therebetween whereby, upon inflation, outward relative expansion of the sidewall portions serves to reduce the interior diameter of the ring for frictionally embracing the peripheral wall of a dredge pipe to which the flotation ring is assembled.

Other objects, features and advantages of the invention will be apparent from the following description when read with the accompanying drawings. In the drawings, wherein like reference numerals denote corresponding parts throughout the several views.

Figure 1:
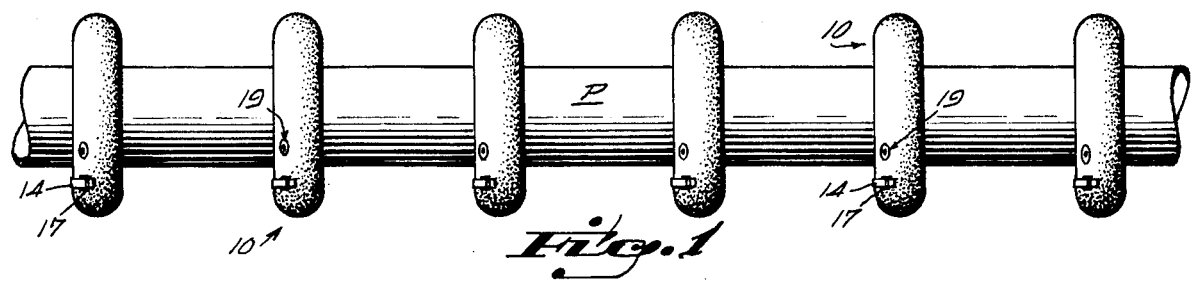
FIG. 1 is a side elevational view of a length of dredge pipe fitted with flotation rings embodying the invention.
Figure 4:
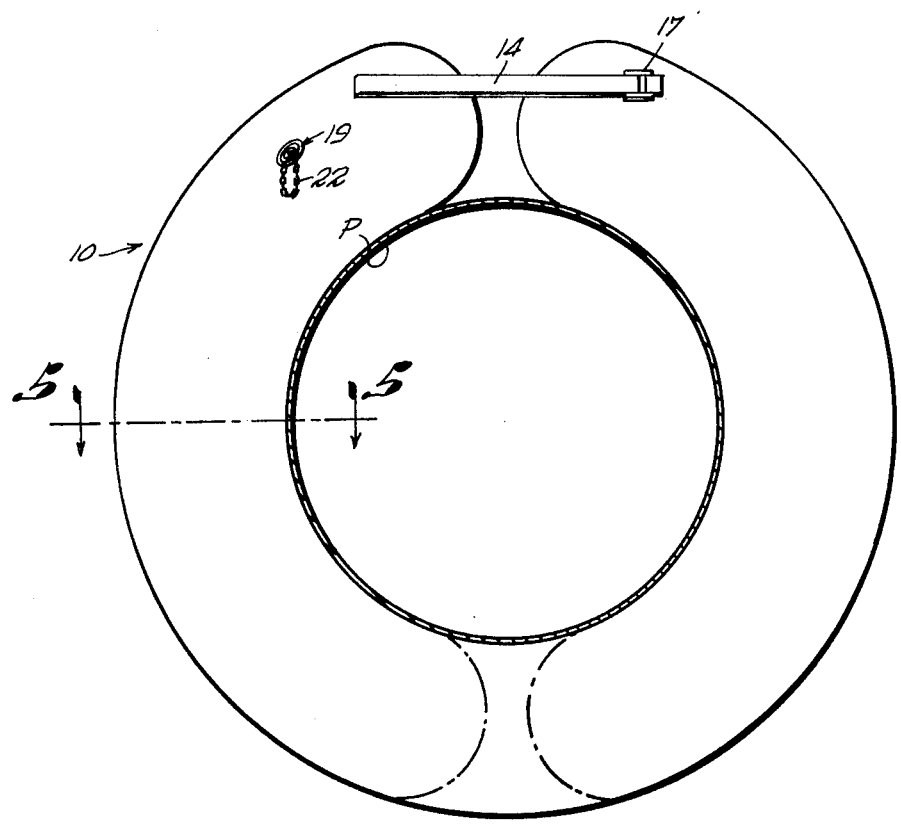
Figure 5:
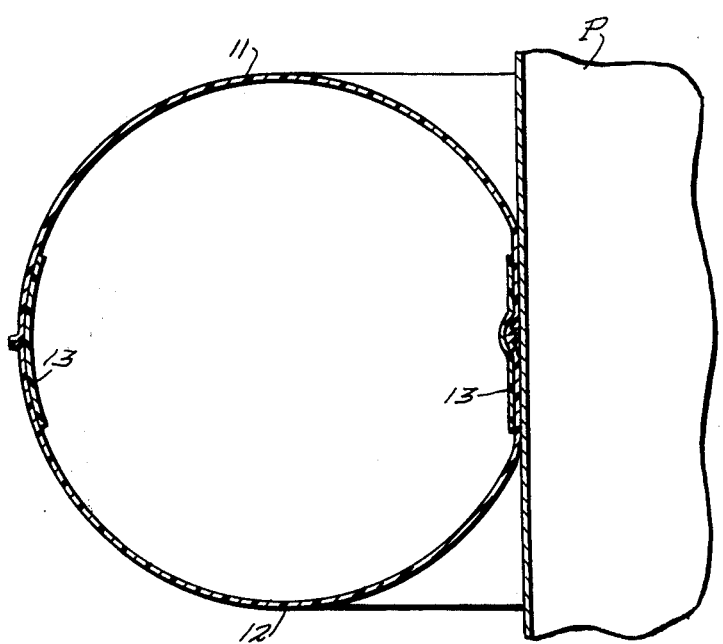

FIG. 4 is a transverse cross-sectional view of the length of dredge pipe illustrated in FIG. 1 on an enlarged scale and illustrating one of the flotation rings inflated thereabout in an embracing position of use; and FIG. 5 is a transverse cross-sectional view taken along the line 5—5 of FIG. 4 in the direction of the arrows and illustrating how the flotation ring, upon its inflation, contracts radially to establish firm frictional contact engagement with the dredge pipe.

Figure 2:
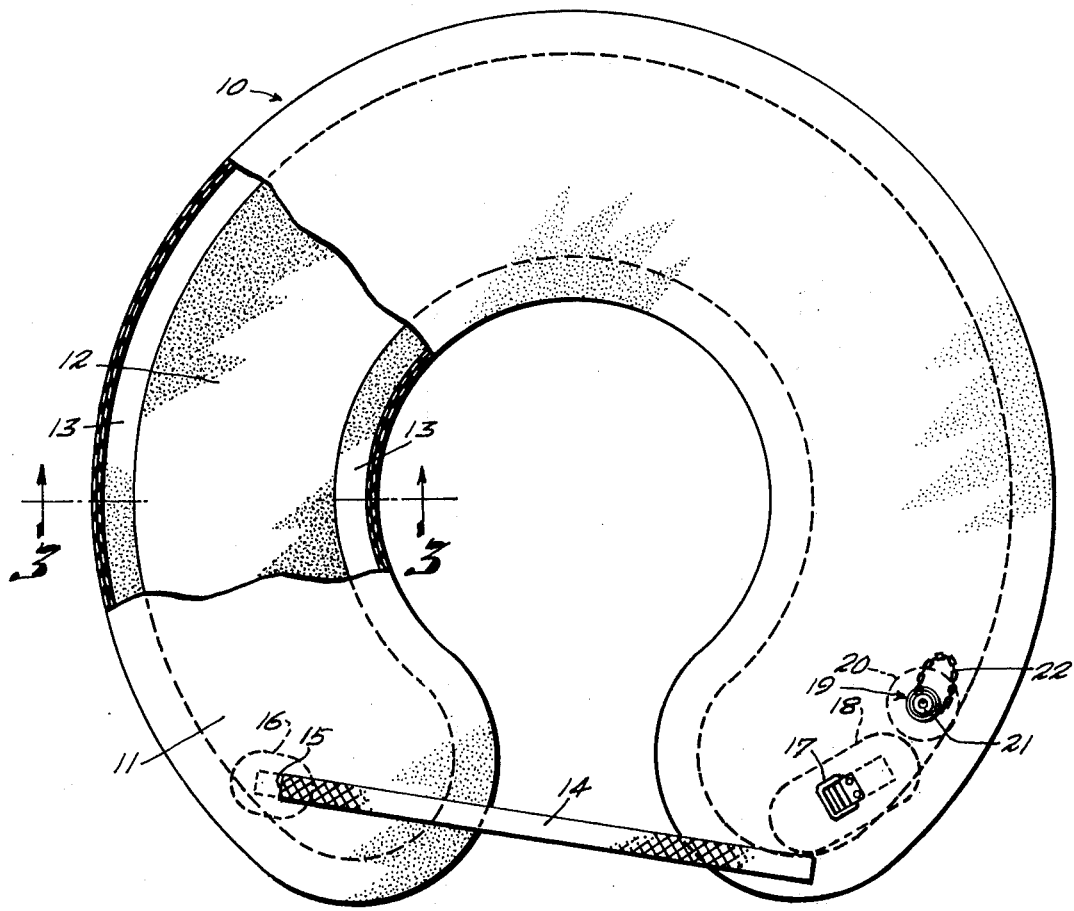
FIG. 2 is a front elevational view of one of the flotation rings of FIG. 1, shown separately on an enlarged scale and completely deflated.
Figure 3:
FIG. 3 is a transverse cross-sectional view taken along the line 3—3 of FIG. 2 in the direction of the arrows.

Referring now in detail to the drawings, reference numeral 10 designates, generally, a flotation ring for dredge pipe lines embodying the invention, a plurality of the flotation rings being shown assembled along the length of dredge pipe P in FIG. 1 to typically illustrate usage in the flotation of dredge line piping. As best illustrated in FIGS. 2 and 3, the flotation ring 10 is fabricated of a pair of C-shaped front and back sidewall portions 11, 12 of a tough flexible water-tight material, such as fabric-reinforced rubber or rubber-like sheet material, secured to one another about their mating peripheral edges by a stiffening seam. To this end, there is sandwiched between opposed inner peripheral edge portions of the front and back sidewall portions 11, 12 of the flotation ring 10, a doubled-over strip of similar rubberized fabric material 13, the open edges of which extend inwardly, and to the outer surfaces of which said marginal peripheral edge portions of said front and back sidewall portions are hermetically bonded, such as by vulcanization.

As best illustrated in FIG. 2, one end of a flexible strap 14 is fixed the front sidewall portion 11 of the flotation ring near one end thereof. The flexible strap 14 is secured in place as by inserting a short end portion thereof to a slot 15 in the front sidewall portion 11, whereat it is secured from behind as by a vulcanized patch 16. A strap buckle 17 is similarly secured to the other end of the front sidewall portion 11 as by an interior vulcanized patch 17 for cooperative attachment to an outer end portion of the flexible strap 14, for the purpose hereinafter described.

The front sidewall portion 11 is also provided with an inflation fitting 19 reinforced from behind by a vulcanized patch 20, said fitting being provided with a screw-on closure cap 20 captured by a chain 22.

In use of the flotation rings, they will first be fully deflated to permit separation of the open ends to such an extent that they can be fitted about the periphery of dredge pipe upon which they are to be installed. Upon each flotation ring being fitted in place, it will be temporarily retained in its fitted position by use of its strap and buckle 14, 17. Following this procedure, a single workman can first apply a series of the flotation rings in properly spaced relation along the length of dredge piping without the possibility of one or more falling away from the pipe, as can readily happen when making the installation in rough waters. After a series of the flotation rings have thus been installed, is a simple matter for the workman, still working along, to inflate them one at a time to complete the installation.

In operation, it is particularly to be noted that while the internal diameter of the inflated flotation ring as illustrated in FIG. 2, for example will be approximately the same as that of the dredge pipe to which it is to be assembled, upon inflation the internal diameter will have a tendency to constrict and squeezingly embrace the pipe, thereby effecting a secure frictional grip to prevent dislodgement, either axially or rotatively. This constriction of the flotation ring upon its inflation is an indirect effect of the relative sideward expansion of a sidewall portion 11, 12. Such outward movement of the sidewalls applies a substantial tensile stress along the outer edge portion of the stiffening strip material 13, which has limited give, while at the same time imposing a compressive stress along the inner circle portion of the stiffening seam, which can readily give in compression. The ring also expands somewhat in overall length, whereby the combination of these forces imposed by inflation achieves the desired embracing and closing attachment about the pipe. In this connection it is to be noted that the strap and buckle attachment means 14, 17 is useful only in temporarily retaining a deflated flotation ring in place prior to inflation, as described above, and is not needed after inflation. The strap and buckle can therefore be entirely dispensed with if installation of the flotation rings is to be made along dredge piping in calm waters.

While I have illustrated and described herein only one form in which the invention can conveniently be embodied in practice, it is to be understood that this form is given by way of example only, and not in a limiting sense. The invention, in brief, comprises all the embodiments and modifications coming within the scope and spirit of the following claims.

What I claim as new and desire to secure by Letters Patent is:

1. A flotation ring for dredge pipe lines comprising, in combination, a substantially flat pair of C-shaped front and back sidewall portions of a tough flexible resilient water-tight material, means for securing peripheral marginal edge portions of said front and back sidewall portions to one another to define an inflatable chamber, said peripheral securing means comprising means for stiffening the outer peripheral edge portions of said sidewall portions to increase the tensile strength therealong as compared with remaining portions of said front and back sidewall portions thus causing the resulting C-shaped ring to close and constrict inwardly upon inflation, and air passage means in one of said sidewall portions to permit inflation of said chamber.

2. A flotation ring for dredge pipe lines as defined in claim 1, wherein said peripheral marginal edge portions securing means comprises a doubled-over strip of material sandwiched between said outer peripheral portions of said sidewall portions, the open edges of said doubled-over strip of material extending inwardly of said chamber.

3. A flotation ring for dredge pipe lines as defined in claim 2, wherein said sidewall portions and said strip of material are comprised of rubberized fabric.

4. A flotation ring for dredge pipe lines as defined in claim 1, including means for securing open end portions of said C-shaped front and back sidewall portions together prior to inflation.

5. A flotation ring for dredge pipe lines as defined in claim 4, wherein said open end portions securing means comprises a strap secured at one end to one of said open end portions and a buckle secured to the other of said open end portions.

* * * * *